US006424498B1

(12) United States Patent
Patterson et al.

(10) Patent No.: US 6,424,498 B1
(45) Date of Patent: Jul. 23, 2002

(54) SHOCK RESISTANT SUSPENSION LIMITER FOR A DISC DRIVE

(75) Inventors: Robert Stuart Patterson, San Diego, CA (US); Ted Randal McDonald, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/608,487

(22) Filed: Jun. 30, 2000

Related U.S. Application Data (60) Provisional application No. 60/169,023, filed on Dec. 3, 1999.

(51) Int. Cl.[7] .................................................. G11B 5/48
(52) U.S. Cl. .................................................... 360/245.7
(58) Field of Search ................. 360/245.7, 234.5–234.7, 360/245.8, 245.6, 244.2

(56) References Cited

U.S. PATENT DOCUMENTS

| | | | |
|---|---|---|---|
| 4,724,500 A | 2/1988 | Dalziel | |
| 5,333,085 A | 7/1994 | Prentice et al. | |
| 5,570,249 A | 10/1996 | Aoyagi et al. | |
| 5,771,136 A | 6/1998 | Girard | |
| 5,815,349 A | 9/1998 | Frater | |
| 5,838,517 A | 11/1998 | Frater et al. | |
| 5,930,079 A * | 7/1999 | Vera et al. | 360/245.7 |
| 5,987,733 A | 11/1999 | Goss | 29/603.03 |
| 6,028,741 A | 2/2000 | Kazama | |
| 6,046,883 A | 4/2000 | Miller | |
| 6,067,209 A * | 5/2000 | Aoyagi et al. | 360/245.7 |
| 6,069,733 A | 5/2000 | Frater et al. | |
| 6,137,657 A * | 10/2000 | Coon et al. | 360/245.7 |
| 6,172,853 B1 * | 1/2001 | Davis et al. | 360/245.7 |
| 6,195,237 B1 * | 2/2001 | Perez | 360/245.7 |
| 6,233,121 B1 * | 5/2001 | Pan | 360/245.7 |
| 6,243,235 B1 * | 6/2001 | Fu et al. | 360/245.7 |
| 6,266,212 B1 * | 7/2001 | Coon | 360/245.7 |
| 6,320,729 B1 * | 11/2001 | Coon | 360/245.7 |

FOREIGN PATENT DOCUMENTS

WO   PCT/US98/00464   1/1998

* cited by examiner

Primary Examiner—Allen Cao
(74) Attorney, Agent, or Firm—John B. Phillips; Merchant & Gould P.C.

(57) ABSTRACT

A suspension limiter for limiting travel of a read/write transducer gimbal in a disc drive is disclosed that positively engages or interlocks with a feature of the load beam supporting the gimbal, or vice versa, to preclude disengagement of the limiter during an abnormal external shock event. One embodiment has a hook on the load beam that fits within a hole gimbal to interlock the two together. Another embodiment has a hook on the gimbal that fits within a hole in the load beam during a shock event. Another embodiment has tabs on the gimbal that hook over a notch in side fingers extending from the end of the load beam on either side of the gimbal. Another embodiment has a hooked tab on the load beam that extends through a aperture in the gimbal to interlock the gimbal and load beam together during a shock load event. Each of the embodiments prevents catastrophic plastic deformation of the gimbal during such events.

21 Claims, 5 Drawing Sheets

SHOCK RESISTANT SUSPENSION LIMITER FOR A DISC DRIVE

RELATED APPLICATIONS

This application claims priority of United States provisional application Ser. No. 60/169,023, filed Dec. 3, 1999.

FIELD OF THE INVENTION

This application relates generally to disc drive data storage devices and more particularly to a shock limiting suspension for a magnetic read/write transducer in a disc drive.

BACKGROUND OF THE INVENTION

Typically a gimbal assembly at one end of an elongated flexure sometimes called a load beam or suspension member supports the head over the data disc in a disc drive. The other end of the flexure or load beam is securely fastened, usually by staking, to a distal end of an actuator arm that is rotatably positioned adjacent the disc or stack of discs in the disc drive. Suspension limiters are used in those disc drives designed to park the read/write transducers or heads off of the discs on a shelf or ramp when the drive is typically either in a power saving mode or deenergized. The suspension limiter functions to help lift the head from the disc during head unload to the ramp and to prevent excessive strain on the gimbal during unload and prevent excessive strain if the drive is subjected to a shock load while the drive is deenergized or in a power save mode and the heads are positioned off of the disc. The end of the flexure carrying the head is suspended by a tab extending from the free end of the flexure into a slot formed in the parking ramp.

The head is supported by a gimbal attached to the load beam that permits the head to pitch, roll and yaw about the pivot point on the gimbal. The gimbal, in turn, is suspended from the load beam. When a shock load is applied to the deenergized drive, the head tends to move away from its supporting gimbal. A shock limiter is typically an extension tab on the gimbal which, when the drive is placed under a predetermined external shock load, engages a portion of the flexure or load beam to prevent excessive movement of the gimbal that would otherwise plastically deform the gimbal. However, if the shock load is substantial, the limiter may be twisted out of engagement with the load beam, and plastic deformation of the gimbal may result. In addition, once the limiter is disengaged, the limiter may interfere with proper orientation of the gimbal when the shock load is removed.

Accordingly there is a need for a shock limiting device in a disc drive that does not disengage the gimbal under any anticipated shock load condition.

SUMMARY OF THE INVENTION

Against this backdrop the present invention has been developed. The present invention is a suspension limiter that positively engages or interlocks with a feature of the load beam supporting the gimbal, or vice versa, that in turn supports the read/write transducer to preclude disengagement of the limiter during a shock event. One embodiment of the suspension limiter in accordance with the present invention has a cantilevered arm extending from the gimbal that extends over a portion of the load beam. The distal end of the cantilevered arm has a hook shape and a tip adapted to interlockingly engage an aperture in the portion of the load beam directly beneath the hooked end of the arm. Other embodiments have a hooked tab that interlockingly engages an aperture either in the gimbal or the load beam to interfere with and thus prevent the tab from disengaging the gimbal from the load beam thus limiting the travel of the head and gimbal away from the load beam when excessive shock loads are applied to the drive. These and various other features as well as advantages which characterize the present invention will be apparent from a reading of the following detailed description and a review of the associated drawings.

DETAILED DESCRIPTION

Figure 1:
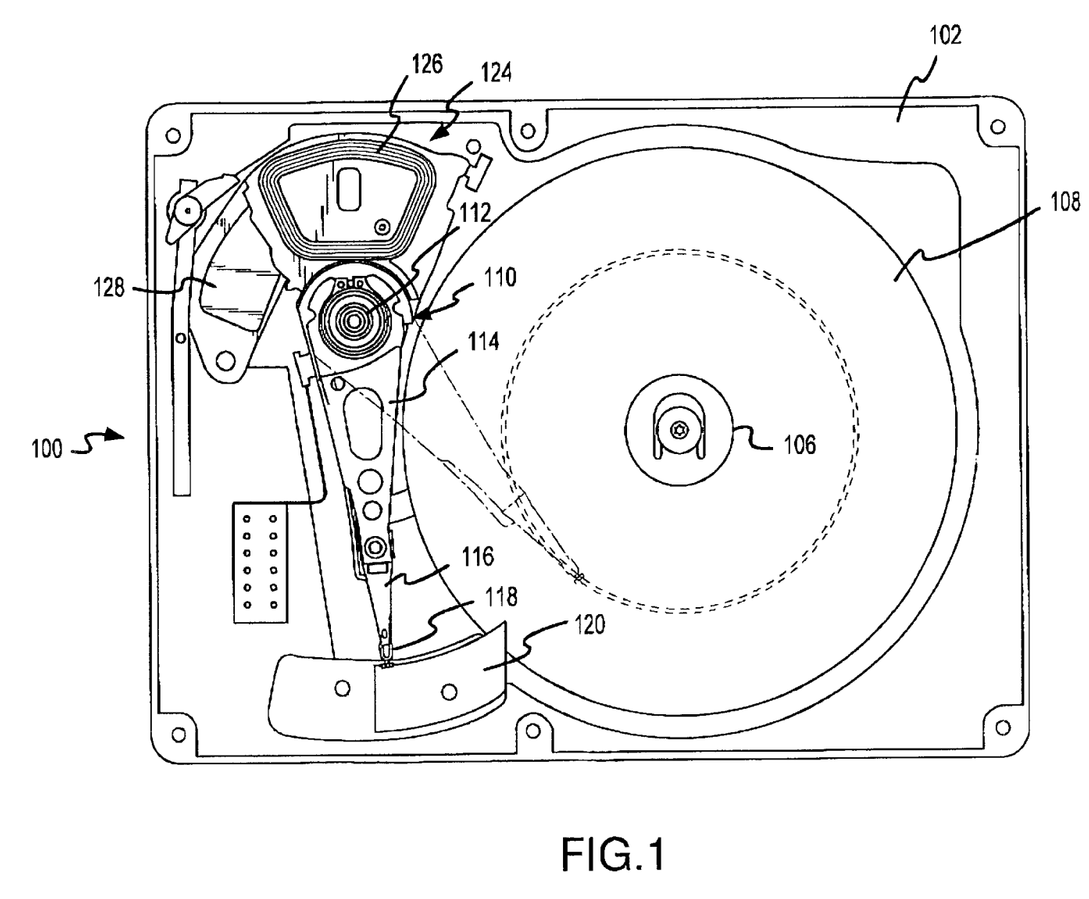
FIG. 1 is a plan view of a disc drive incorporating a preferred embodiment of the suspension limiter in accordance with the present invention showing the primary internal components.

A disc drive 100 constructed in accordance with one preferred embodiment of the present invention is shown in FIG. 1. The disc drive 100 includes a base 102 to which various components of the disc drive 100 are mounted. A top cover (not shown), cooperates with the baseplate 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures or load beams 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved outward, off of the discs 108 and onto a parking ramp 120 adjacent the outer diameter of the discs 108 when the drive motor is de-energized. The heads 118 are secured on the parking ramps 120 through the use of an actuator latch arrangement, which prevents inadvertent rotation of the actuator assembly 110 when the heads are parked.

Figure 2:
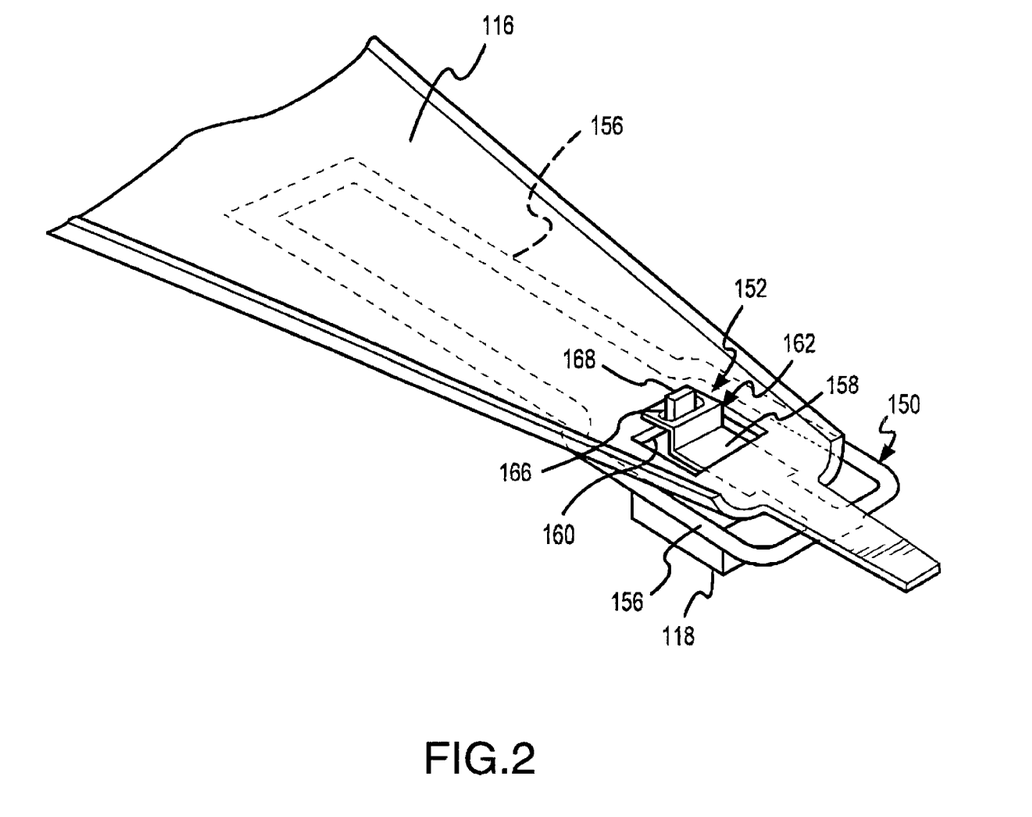
FIG. 2 is an enlarged perspective view of the distal end of a load beam and transducer head assembly showing a first preferred embodiment of the suspension limiter in accordance with the present invention.

FIG. 2 shows a greatly enlarged perspective view of the load beam 116 supporting a gimbal 150 that, in turn, supports the transducer or head 118. The load beam 116 and gimbal 150 incorporates a first preferred embodiment of the suspension limiter 152 in accordance with the invention. The top of the head 118 is fastened to the underside of the gimbal 150 that is in turn fastened to the distal end of the load beam 116. The gimbal 150 is an elongated spring sheet metal stamping that has an elongated frame portion 156 supporting an inner head support portion 158 canntilevered from the frame portion 156. The head support portion 158 is typically bonded to the top of the transducer or head 118 as seen in FIG. 2. The configuration of the gimbal 150 permits the head 118 a substantial range of freedom of movement about the mounting point so that the head 118 can pitch, roll, and yaw about the attachment point in order to accurately follow the surface contours of the disc during drive operation.

The load beam 116 is an elongated sheet metal body that has a cutout 160 adjacent the distal end of the load beam 116. The gimbal 150 is in turn an elongated sheet metal stamping that has a bent tab 162 having an L shape extending from a rear end of the inner head support portion 158. This tab 162 has a catch hole 164 in its long leg 166. The load beam 116 has a hook shaped tab 168 that extends upward from the cutout 160. This tab 168 projects through the catch hole 164 in the long leg 166 of the bent tab 162 so that when and if the disc drive 100 is subjected to a substantial external shock event, the gimbal 150 will flex downward until the long leg 166 of the tab 162 hits the load beam 116. This limits the deflection of the gimbal 150. If the shock load is strong enough, the applied forces may deflect the tab 162 sufficiently to cause the tab 162 to try to slip off and disengage from the load beam 116. However, the bent up hook tab 168 projecting through the catch hole 164 interlocks with the long leg 166 to stop any further movement of the tab 162. The hook tab 168 thus prevents deformation of the tab 162 and dislodgement of the tab 162 from the load beam 116. This configuration essentially positively latches the gimbal 150 to the load beam 116 during such events and, in turn, prevents undesirable deformation of the gimbal 150 that would otherwise catastrophically prevent the head 118 from being repositioned onto the disc 108 when the drive 100 is reenergized.

Figure 3:
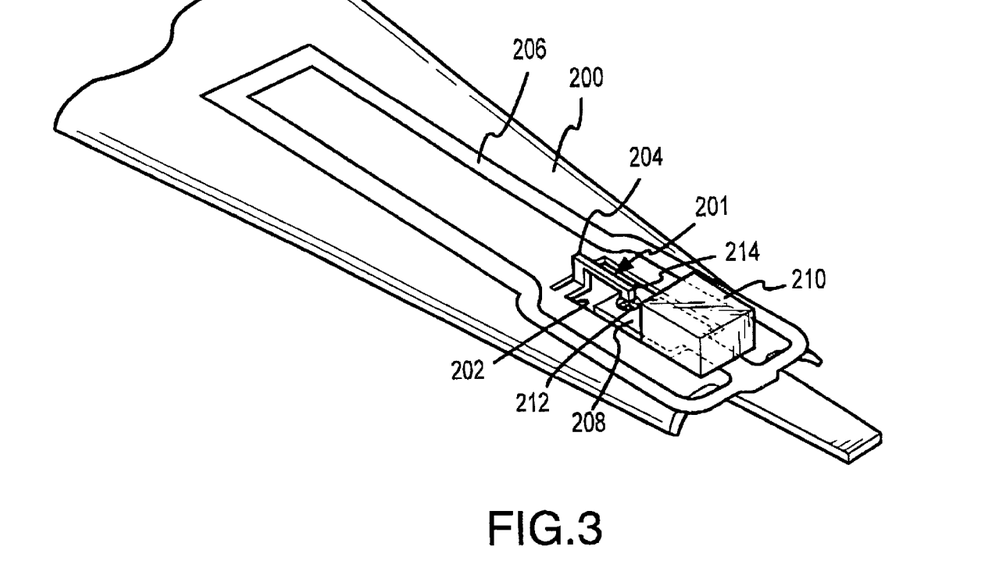
FIG. 3 is an enlarged perspective view of the distal end of the load beam and head assembly showing a second preferred embodiment of the suspension limiter in accordance with the present invention.

FIG. 3 illustrates another preferred embodiment of a suspension limiter 201 in accordance with the present invention. A portion of the distal end of a load beam 200 is shown in 10 perspective in FIG. 3 as viewed from the disc surface. The load beam 200 has a cut out 202 forming a hook 204 that is bent upward at a right angle to the surface plane of the load beam 200. The load beam 200 has one end of an elongated gimbal 206 laser welded to the load beam 200. The other end of the gimbal has a head mounting plate portion 208 to which a transducer head 210 is fastened. The head mounting plate portion 208 has a catch hole 212 through a rear end of the head mounting plate portion 208. The catch hole 212 is vertically aligned with a downwardly extending hook tip 214 which is sized to fit into the catch hole 212.

The hook 204, catch hole 212, and the hook tip 214 make up the suspension limiter in this embodiment. When a shock load is applied to the disc drive in which this embodiment is used, in a downward direction, as seen in FIG. 3, the head 210 initially moves upward, pulling the gimbal 206 upward such that the hook tip 214 of the hook 204 extends into the catch hole 212 in the head mounting plate portion 208 and limiting the upward travel of the gimbal 206 with respect to the load beam 200 thereby preventing any plastic deformation of the gimbal 206 and the engagement of the hook tip 214 in the catch hole 212 prevents the potential disengagement of the hook 204 from the mounting plate portion 208.

Figure 4:
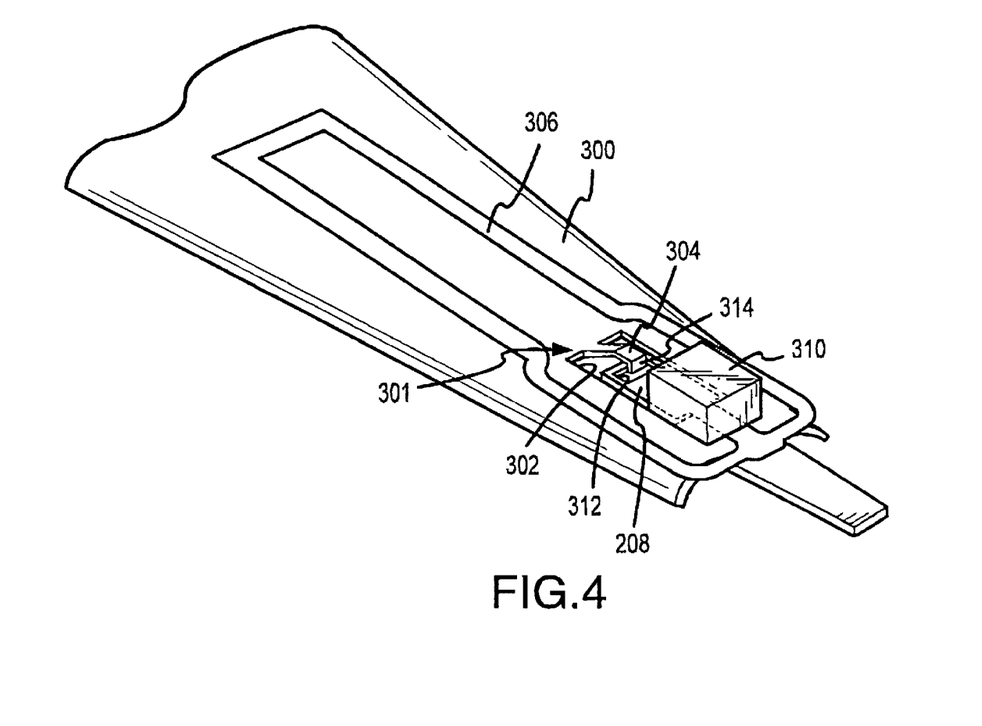
FIG. 4 is an enlarged perspective view of the distal end of another load beam and head assembly showing a third suspension limiter in accordance with a third preferred embodiment of the present invention.

FIG. 4 illustrates another preferred embodiment of a suspension limiter 301 in accordance with the present invention. This embodiment is very similar to the second embodiment discussed immediately above. A portion of the distal end of a load beam 300 is shown again in perspective in FIG. 4 as viewed from the disc surface. The load beam 300 has a cut out 302 forming a tab hook 304 that is bent upward from the surface plane of the load beam 300. In this embodiment, however, the hook 304 is not at a right angle to the surface plane of the load beam 300 as in hook 204. Instead, the tab hook 304 has a tab portion that extends in a plane parallel to the surface lane of the load beam 300. The load beam 300 has one end of an elongated gimbal 306 laser welded to the load beam 300. The other end of the gimbal 306 has a head mounting plate portion 308 to which a transducer head 310 is fastened. The head mounting plate portion 308 has an elongated catch hole 312 through a rear end of the head mounting plate portion 308. The elongated catch hole 312 is vertically aligned with a downwardly bent tab hook tip 314 which is sized to fit into the catch hole 312.

The tab hook 304, catch hole 312, and the tab hook tip 314 make up the interlocking suspension limiter in this embodiment. When a shock load is applied to the disc drive in which this embodiment is used, in a downward direction, as seen in FIG. 4, the head 310 again initially moves relatively upward, away from the load beam 300, pulling the gimbal 306 upward such that the hook tip 314 of the hook 304 extends into the catch hole 312 in the head mounting plate portion 308 and limiting the upward travel of the gimbal 306 with respect to the load beam 300 thereby preventing any plastic deformation of the gimbal 306. The interlocking engagement of the hook tip 314 in the catch hole 312 prevents the potential disengagement of the tab hook 304 from the mounting plate portion 308 of the gimbal 306 during the event.

Figure 5:
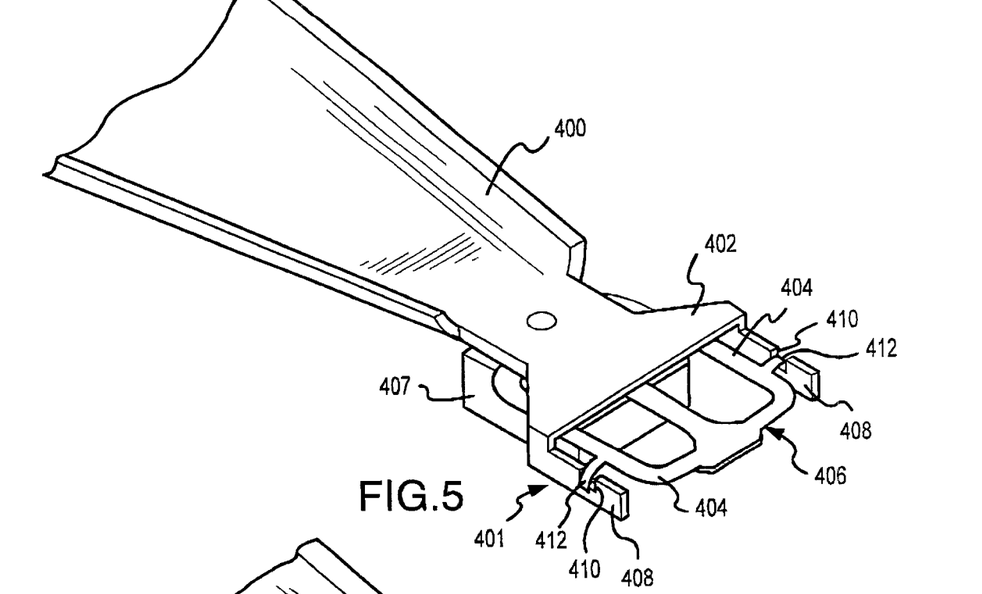
FIG. 5 is an enlarged perspective view of the distal end of another load beam and head assembly showing a fourth preferred embodiment of the limiter in accordance with the present invention.

Another embodiment of a suspension limiter 401 in accordance with the invention is shown in FIG. 5. In this figure, the distal end of a load beam 400 is shown in a perspective top view toward a disc 108. The load beam 400 in this embodiment does not have a cut out forming a hook. Instead, the distal end of the load beam 400 widens into a reverse tapered end 402 that covers the side rails 404 of an elongated gimbal 406, which in turn supports a transducer head 407.

A pair of fingers 408 is formed by downward bends at opposite corners of the end 402. One finger 408 extends alongside each of the rails 404 of the gimbal 406. Each of the fingers 408 has a notch 410 cut into its upper edge. Each of the side rails 404 of the gimbal 406 has an outwardly projecting and downwardly hooked wing tab 412 that projects laterally outward directly over the notch 410 in the adjacent finger 408.

In this embodiment, the load beam 400 will be supported on a ramp (not shown) when parked that engages a portion of the load beam behind the head 407. During normal drive operation, there is no interaction between the fingers 408 and the gimbal 406. When the actuator assembly is parked on the ramp, there is also no interaction normally between the fingers 408 and the gimbal 406. However, if an external shock load is applied to the drive, the head 407 may tend to move away from the load beam 400, e.g., downward in FIG. 5, causing the side rails 404 of the gimbal 406 to follow. The side fingers 408 limit the downward movement of the gimbal 406. The hooked tabs 412 interlockingly engage the fingers 408 in the notches 410 to prevent the tabs 412 from being dislodged from the fingers 408 during excessive shock load events.

Figure 6:
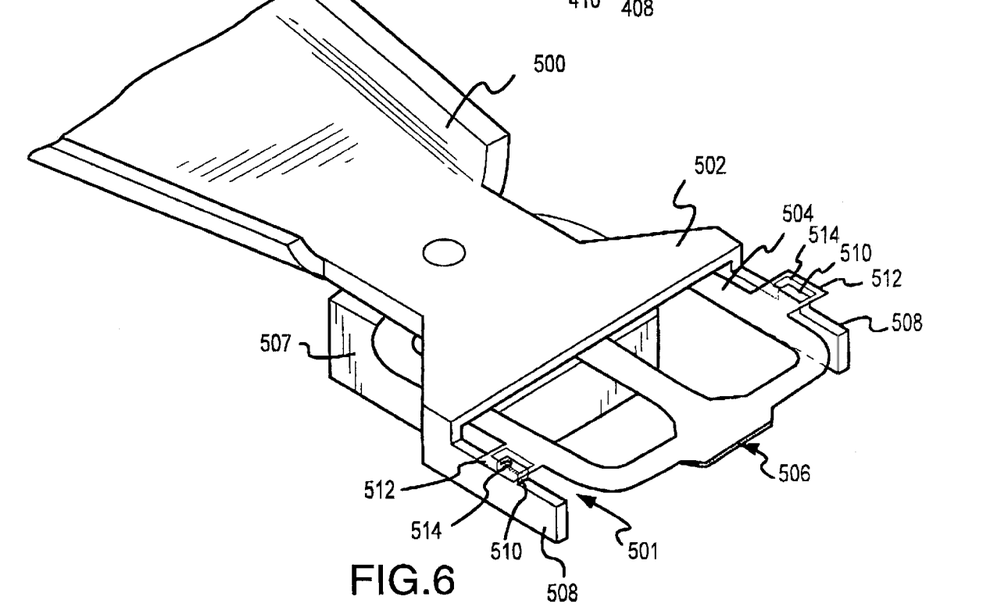
FIG. 6 is an enlarged perspective view of the distal end of another load beam and head assembly showing a fifth preferred embodiment of the suspension limiter in accordance with the present invention.

Another embodiment of a suspension limiter 501 in accordance with the invention is shown in FIG. 6. This embodiment is very similar to that shown in FIG. 5 except for the limiter configuration. Again, the distal end of a load beam 500 widens into a reverse tapered end 502 that covers the side rails 504 of an elongated gimbal 506, which in turn supports a transducer head 507. A pair of fingers 508 is formed by downward bends at opposite corners of the end 502. One finger 508 extends alongside each of the rails 504 of the gimbal 506. Each of the fingers 508 has a tab 510 that extends upward from its upper edge. Each of the side rails 504 of the gimbal 506 has an outwardly projecting flat tab 512 that extends laterally outward directly over the tab 510 in the adjacent finger 508. The flat tab 512 has an aperture 514 therethrough that is sized to receive the tab 510.

The load beam 500 will be supported on a ramp (not shown) when parked that engages a portion of the load beam behind the head 507. Again, during normal drive operation, there is no interaction between the fingers 508 and the gimbal 506. When the actuator assembly is parked on the ramp, there is also no interaction normally between the fingers 508 and the gimbal 506. However, if an external shock load is applied to the drive, the head 507 may tend to move away from the load beam 500, e.g., downward in FIG. 6, causing the side rails 504 of the gimbal 506 to follow. The side fingers 508 limit the downward movement of the gimbal 506 by engaging the tabs 512. The tabs 512 are prevented from disengaging the fingers 508 under excessive shock loadings by the vertical tabs 510 entering the apertures 514 and interlocking the tabs together during the event. Thus the engagements of the tabs 510 in the apertures 514 prevent the tabs 512 from being dislodged from the fingers 508 during excessive shock load events.

Figure 7:
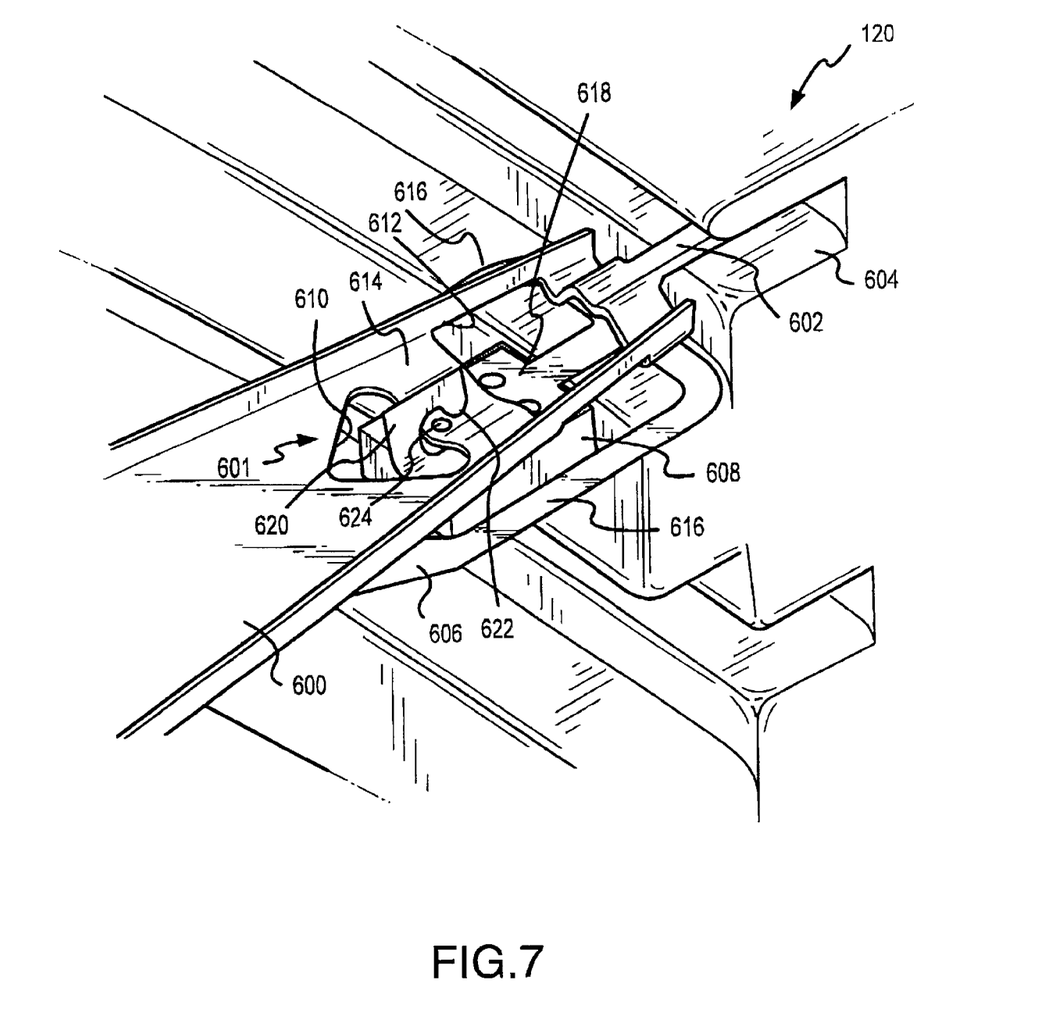
FIG. 7 is an enlarged perspective view of the distal end of a load beam and head assembly showing a sixth preferred embodiment of the suspension limiter in accordance with the present invention also shown in FIG. 1.

A still further preferred embodiment of a suspension limiter 601 in accordance with the present invention is shown in FIG. 7. This embodiment of the interlocking suspension limiter 601 of the present invention is similar to that shown in FIG. 3 except that the suspension limiting hooked tab is formed in the gimbal rather than the load beam. A distal end of a load beam 600 is shown in FIG. 7. The load beam 600 is a sheet metal body that has a parking tip 602 at its distal end that extends into a parking groove 604 in the parking ramp 120 when the drive 100 is deenergized as shown in FIG. 1. An elongated gimbal 606 supports a transducer head 608 beneath the load beam 600. The load beam 600 has a pair of spaced cutouts 610 and 612 above the gimbal 606 defining a web portion 614 of the load beam therebetween. The gimbal 606 is a sheet metal body that has a pair of side rails 616 and a central cantilevered head support portion 618 beneath the web portion 614 of the load beam 600. The head 608 is attached to the underside of the head support portion 618. The head support portion 618 has an upwardly bent suspension limiter hook 620 formed at its rear end. This bent hook extends up through the cutout 610 and over the web portion 614 and has a downwardly projecting tip 622. The web portion 614 has an aperture 624 directly beneath the tip 622 sized to receive the tip 622 in a shock event as in the previously described embodiments. The engagement of the tip 622 in the aperture 624 again interlockingly prevents the hook 620 from disengaging the web 614 during excessive shock events. The aperture may not necessarily be directly beneath the tip 622. The aperture may be positioned offset from a direct alignment such that during such a shock event, the limiter hook 622 does not need to insert immediately directly into the aperture 624, but may slide along the surface of the web portion 614 and into the aperture 624 and catch during elastic deformation in the event. This offset configuration between the limiter and the feature engaged during the shock event may be incorporated as well into the other embodiments described above. The offset arrangement helps maintain a close gap between the limiter 620 and the mating feature such as aperture 624, which is desirable during the ramp unload process during power save or power down.

In summary, the present invention may be viewed as a suspension limiter (such as 151, 201, 301, 401, 501, or 601) for a load beam and head support assembly in a disc drive (such as 100) wherein a transducer head (such as 118, 210, 310, 407, 507 or 608) is supported by a gimbal (such as 156, 206, 306, 406, 506, or 606) fastened to a distal end of a load beam (such as 116, 200, 300, 400, 500, or 600). The suspension limiter includes a limiting member (such as 162, 204, 304, 412, 512, or 620) formed on one of the load beam (such as 116, 200, 300, 400, 500 or 600) or the gimbal (such as 156, 206, 306, 406, 506, or 606) and a feature (such as 168, 212, 312, 410, 510, or 624) on the other of the load beam or the gimbal wherein the limiting member 162, 204, 304, 412, 512, or 620) and the feature (such as 168, 212, 312, 410, 510, or 624) interlockingly engage to prevent disengagement of the limiting member and feature during the shock event. More specifically, the feature may include an aperture (such as 166, 212, 312, 514, or 624) in one of the load beam or gimbal and the limiting member may have a tip (such as 214, 314, 510 or 622) positioned to enter the aperture (such as 212, 312, 514, or 624) to prevent disengagement during a shock event. The gimbal may have a curved hook shaped tab (such as 412) projecting over a notch (such as 410) in an elongated finger (such as 408) projecting from the load beam (such as 400) wherein the tab (such as 412) engages the notch (such as 410) to prevent disengagement of the tab (such as 412) from the finger (such as 408) during a shock event.

The interlocking feature may alternatively be on the load beam (such as 168, or 624) and the limiting member (such as 162) may extend from a cantilevered head support portion (such as 158) of the gimbal (such as 156) directly over the feature (such as 168) on the load beam (such as 116). The feature may be an aperture (such as 624) through the load beam (such as 600) sized and positioned to receive a downwardly extending tip (such as 622) of a hook shaped limiting member (such as 620) during a shock event. The limiter feature may be on the gimbal (such as 202, 312, 412, and 514) and the limiting member may be an elongated member (such as 204, 304, 408, and 508) extending from the load beam (200, 300, 400, or 500). The limiting member may have a hook shape (such as 204 or 304) for engaging a tab portion of the gimbal (such as 208 or 308) and interlockingly fitting into an aperture (such as 212 or 312) in the tab portion (such as 208 or 308) during a shock event.

The limiting member may include an elongated finger (such as 408 or 508) extending from the distal end (such as 402 or 502) of the load beam (such as 400 or 500) along side the gimbal (such as 406 or 506). The feature may be a downwardly curved tab (such as 412) laterally extending from the gimbal (such as 406) over a complementary notch (such as 410) formed in the elongated finger (such as 408) beneath the tab (such as 412). Alternatively, the limiting member may further have another elongated finger (such as 408) extending along side the gimbal (such as 406) and the gimbal (such as 406) would have another downwardly curved tab (such as 412) laterally extending from the gimbal (such as 406) over another complementary notch (such as 410) formed in the another elongated finger (such as 408) beneath the another tab (such as 412).

The limiter (such as 501) has a limiting member that comprises a pair of elongated fingers (such as 508) extending from the distal end (such as 502) of the load beam (such as 500) along opposite sides of the gimbal (such as 506). The gimbal has a pair of laterally extending tabs (such as 512) each extending over one of the elongated fingers (such as 508). Each tab (such as 512) has an aperture (such as 514) therethrough. The interlocking feature is a vertical tab (such as 510) projecting upward from each of the fingers (such as 508) toward the aperture (such as 514) in the tab (such as 512) immediately above. When the drive (such as 100) is subjected to a shock load, the vertical tab (such as 510) interlockingly engages the aperture (such as 514) in the gimbal tab (such as 512) immediately above to prevent disengagement of the tabs.

Stated another way, the present invention may be viewed as an actuator assembly (such as 110) for use in a disc drive (such as 100) to move a transducer (such as 118, 210, 310, 407, 507, or 608) over a rotating disc (such as 108). The assembly has an actuator arm (such as 114) carrying a load beam (such as 116) supporting a gimbal (such as 156) at a distal end thereof. The gimbal suspends a transducer (such as 118, 210, 310, 407, 507, or 608) and the assembly has a suspension limiter (such as 152, 201, 301, 401, 501, or 601) for limiting movement of the gimbal (such as 156, 206, 306, 406, 506, or 606) to prevent deformation of the gimbal during an excessive shock event. The suspension limiter (such as 152, 201, 301, 401, 501, or 601) includes a limiting member (such as 168, 204, 304, 408, 508, or 620) formed on one of the load beam or the gimbal and a feature (such as 166, 212, 312, 410, 514, or 624) on the other of the load beam (such as 116, 200, 300, 400, 500, or 600) or the gimbal (such as 156, 204, 304, 408, 508, or 606) wherein the limiting member and the feature interlockingly engage to prevent disengagement of the limiting member and feature during the shock event.

The feature may include an aperture (such as 166, 212, 312, 514, or 624) in one of the load beam or gimbal and the limiting member may have a tip (such as 168, 214, 314, 510, or 622) positioned to enter the aperture (such as 166, 212, 312, 514, or 624) to prevent disengagement during a shock event. The gimbal (such as has 406) may have a curved hook shaped tab (such as 412) projecting over a notch (such as 410) in an elongated finger (such as 408) projecting from the load beam (such as 400). The tab engages the notch to prevent disengagement of the tab from the finger during a shock event. Alternatively, the feature (such as 168 or 624) may be on the load beam (such as 116 or 600) and the limiting member (such as 162 or 620) extends from a cantilevered head support portion (such as 158 or 618) of the gimbal (such as 156 or 606) directly over the feature on the load beam. The feature may be an aperture (such as 624) through the load beam (such as 600) sized and positioned to receive a downwardly extending tip (such as 622) of a hook shaped limiting member (such as 620). Alternatively, the feature may be on the gimbal (such as 166, 212, 312, or 514) and the limiting member is an elongated member (such as 168, 204, 304, or 510) extending from the load beam (such as 116, 200, 300, or 508). The limiting member may have a hook shape (such as 168) for engaging a tab portion (such as 162) of the gimbal (such as 156) and interlockingly fitting into an aperture (such as 166) in the tab portion during a shock event.

In another embodiment, the limiting member is an elongated finger (such as 408) extending from the distal end (such as 402) of the load beam (such as 400) along side the gimbal (such as 406) and the feature is a downwardly curved tab (such as 412) laterally extending from the gimbal over a complementary notch (such as 410) formed in the elongated finger beneath the tab. Further, the limiting member may comprise a pair of elongated fingers (408) extending from the distal end (such as 402) of the load beam (such as 400) along opposite sides of the gimbal (406).

The gimbal (such as 506) may alternatively have a pair of laterally extending tabs (such as 512) each extending over one of the elongated fingers (such as 508), each tab (such as 512) having an aperture (such as 514) therethrough. In this embodiment, the feature is a vertical tab (such as 510) projecting upward from each of the fingers (such as 508) toward the aperture (such as 514) in the tab immediately above whereby when the drive (such as 100) is subjected to a shock load, the vertical tab (such as 510) interlockingly engages the aperture (such as 514) in the gimbal tab (such as 512) immediately above to prevent disengagement of the tabs (such as 512).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, many other different hook and aperture shapes may be envisioned than have been described above. The tip 622 of the hook 620 may have a square or pointed shape rather than the curved tip as shown in FIG. 7. The feature that is interlockingly engaged by the tip 622 of the hook 620 may be a ridge or upwardly bent tab along the rear of the web 618 rather than an aperture 624. Numerous other changes may be made which will readily suggest themselves to those skilled in the art and which are encompassed in the spirit of the invention disclosed and as defined in the appended claims.

What is claimed is:

1. A suspension limiter for a load beam and head support assembly in a disc drive wherein a transducer head is supported by a gimbal fastened to a distal end of a load beam, the suspension limiter comprising:

a limiting member formed on one of the load beam or the gimbal and an engagement feature on the other of the load beam or the gimbal; and means for interlockingly engaging the limiting member and the feature to prevent disengagement of the limiting member and feature during a shock event.

2. A suspension limiter for a disc drive wherein a transducer head is supported by a gimbal fastened to a distal end of a load beam, the suspension limiter comprising:

a limiting member formed on one of the load beam or the gimbal; and a feature on the other of the load beam or the gimbal for contacting the limiting member during a shock event, wherein one of the limiting member and the feature includes an aperture that securely engages a vertical protrusion on the other of the limiting member and the feature to prevent disengagement of the limiting member and the feature during a shock event.

3. The suspension limiter according to claim 2 wherein the feature is on the gimbal and the limiting members on the load beam.

4. The suspension limiter according to claim 3 wherein the gimbal includes a head mounting portion that extends above an opening defined in the load beam, and wherein:

the feature includes the aperture formed in the head mounting portion of the gimbal; and the limiting member comprises a hook formed from a segment of the load beam, the hook extending through the opening defined in the load beam and including a tip positioned above the aperture for securely engaging the aperture during a shock event.

5. The suspension limiter according to claim 4 wherein the hook includes:

a first segment extending from one side of the opening defined in the load beam, the first segment bent at a right angle to extend vertically above a plane of the load beam; and a second segment extending parallel to the plane of the load beam, wherein the hook tip is defined at an end of the second segment so that the hook tip is positioned over the aperture in the absence of a shock event.

6. The suspension limiter according to claim 4 wherein the hook comprises an arm extending from one end of the opening defined in the load beam, the arm bent at an angle to a plane of the load beam so that the hook tip is positioned over the aperture in the absence of a shock event.

7. The suspension limiter according to claim 2 wherein the feature is on the load beam and the limiting member is on the gimbal.

8. The suspension limiter according to claim 7 wherein:

the feature includes the aperture formed on the load beam; and the limiting member comprises a hook extending from a head mounting portion of the gimbal upward through an opening defined in the load beam, the hook including a tip positioned for securely engaging the aperture during a shock event.

9. The suspension limiter according to claim 7 wherein:

the feature comprises a vertical tab extending from the load beam; and the limiting member comprises a horizontal tab extending from the gimbal, the horizontal tab defining the aperture for securely engaging the vertical tab during a shock event.

10. The suspension limiter according to claim 9 wherein the horizontal tab extends vertically upward from a head mounting portion of the gimbal through an opening defined in the load beam, the horizontal tab contacting a surface of the load beam during a shock event, and the vertical tab extending through the aperture defined in the horizontal tab to prevent the horizontal tab from being pulled through the opening defined in the load beam during a shock event.

11. The suspension limiter according to claim 9 wherein:

the feature includes two elongated fingers extending along opposite sides of the gimbal, each elongated finger including a vertical tab extending upward toward the gimbal; and the limiting member includes two horizontal tabs extending outward from opposite sides of the gimbal, each horizontal tab contacting a corresponding one of the elongated fingers during a shock event, and each horizontal tab defining an aperture positioned over the vertical tab of the corresponding elongated finger for securely engaging the vertical tab to prevent disengagement of the horizontal tab and the elongated finger during a shock event.

12. A disc drive having an actuator assembly for moving a transducer over a rotating disc, the actuator assembly comprising:

an actuator arm carrying a load beam supporting a gimbal at a distal end thereof, wherein the transducer is suspended from the gimbal; and a suspension limiter for limiting movement of the gimbal relative to the load beam during a shock event to prevent deformation of the gimbal, wherein the suspension limiter comprises:

a limiting member formed on one of the load beam or the gimbal; and a feature on the other of the load beam or the gimbal for contacting the limiting member during a shock event, wherein one of the limiting member and the feature includes an aperture that securely engages a vertical protrusion on the other of the limiting member and the feature to prevent disengagement of the limiting member and the feature during a shock event.

13. The disc drive according to claim 12 wherein the feature is on the gimbal and the limiting member is on the load beam.

14. The disc drive according to claim 13 wherein the gimbal includes a head mounting portion that extends above an opening defined in the load beam, and wherein:

the feature includes the aperture formed in the head mounting portion of the gimbal; and the limiting member comprises a hook formed from a segment of the load beam, the hook extending through the opening defined in the load beam and including a tip positioned above the aperture for securely engaging the aperture during a shock event.

15. The disc drive according to claim 14 wherein the hook includes:

a first segment extending from one side of the opening defined in the load beam, the first segment bent at a right angle to extend vertically above a plane of the load beam; and a second segment extending parallel to the plane of the load beam, wherein the hook tip is defined at an end of the second segment so that the hook tip is positioned over the aperture in the absence of a shock event.

16. The disc drive according to claim 14 wherein the hook comprises an arm extending from one end of the opening defined in the load beam, the arm bent at an angle to a plane of the load beam so that the hook tip is positioned over the aperture in the absence of a shock event.

17. The disc drive according to claim 12 wherein the feature is on the load beam and the limiting member is on the gimbal.

18. The disc drive according to claim 17 wherein:

the feature includes the aperture formed on the load beam; and the limiting member comprises a hook extending from a head mounting portion of the gimbal upward through an opening defined in the load beam, the hook including a tip positioned for securely engaging the aperture during a shock event.

19. The disc drive according to claim 17 wherein:

the feature comprises a vertical tab extending from the load beam; and the limiting member comprises a horizontal tab extending from the gimbal, the horizontal tab defining the aperture for securely engaging the vertical tab during a shock event.

20. The disc drive according to claim 19 wherein the horizontal tab extends vertically upward from a head mounting portion of the gimbal through an opening defined in the load beam, the horizontal tab contacting a surface of the load beam during a shock event, and the vertical tab extending through the aperture defined in the horizontal tab to prevent the horizontal tab from being pulled through the opening defined in the load beam during a shock event.

21. The disc drive according to claim 19 wherein:

the feature includes two elongated fingers extending along opposite sides of the gimbal, each elongated finger including a vertical tab extending upward toward the gimbal; and the limiting member includes two horizontal tabs extending outward from opposite sides of the gimbal, each horizontal tab contacting a corresponding one of the elongated fingers during a shock event, and each horizontal tab defining an aperture positioned over the vertical tab of the corresponding elongated finger for securely engaging the vertical tab to prevent disengagement of the horizontal tab and the elongated finger during a shock event.

* * * * *